Figure 1:
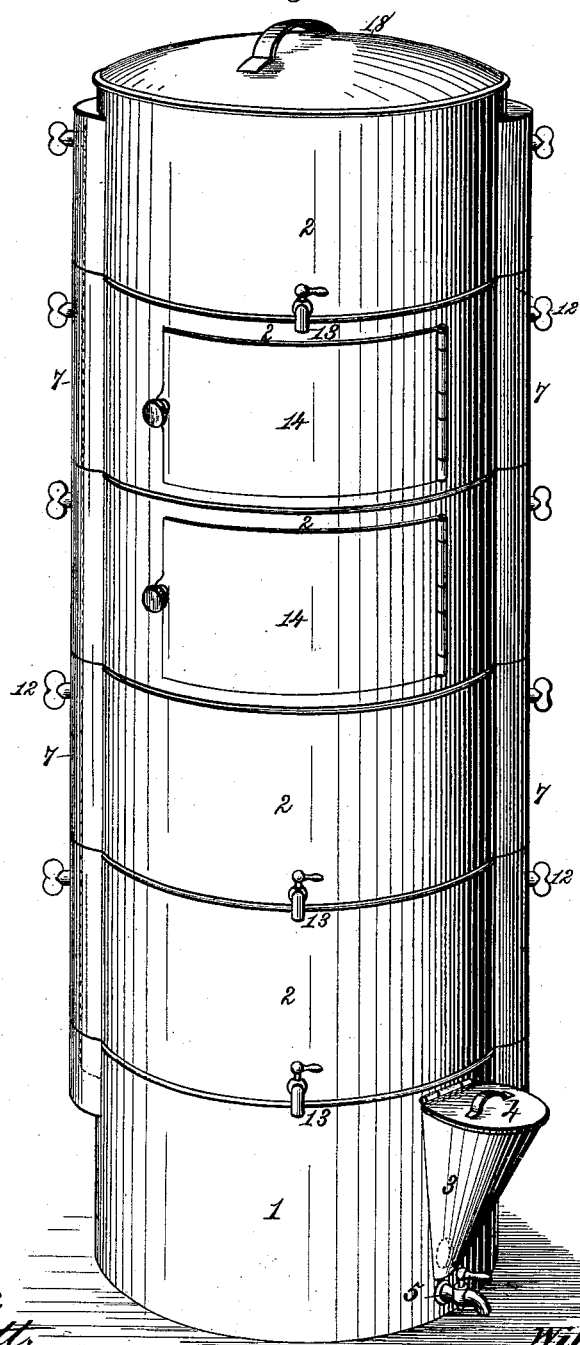

(No Model.) 2 Sheets—Sheet 1.

W. C. SALMON.
STEAM COOKER.

No. 367,240. Patented July 26, 1887.

Witnesses.
Robert Orratt.
Dennis Sumby.

Inventor:
William C. Salmon.
By James L. Norris,
Atty.

(No Model.) 2 Sheets—Sheet 2.
W. C. SALMON.
STEAM COOKER.
No. 367,240. Patented July 26, 1887.
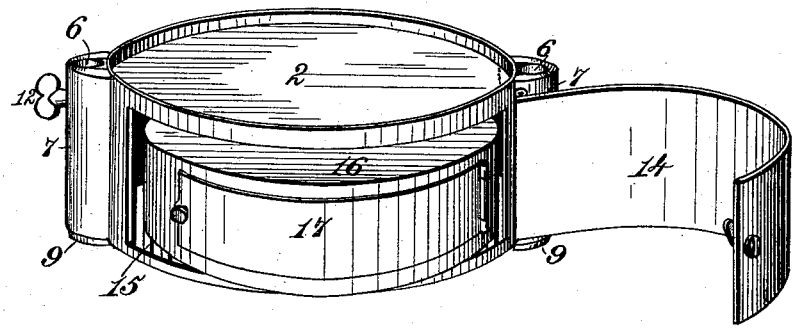
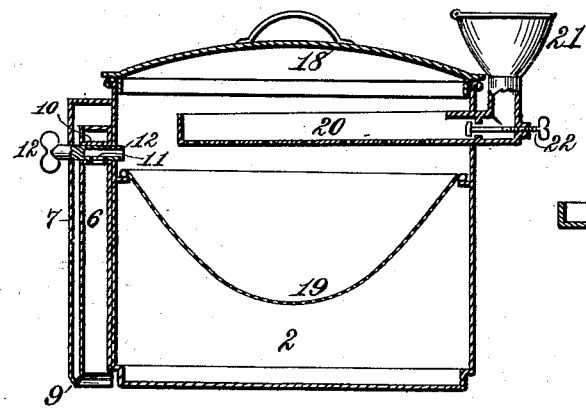
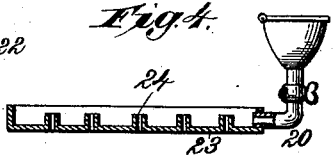
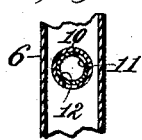
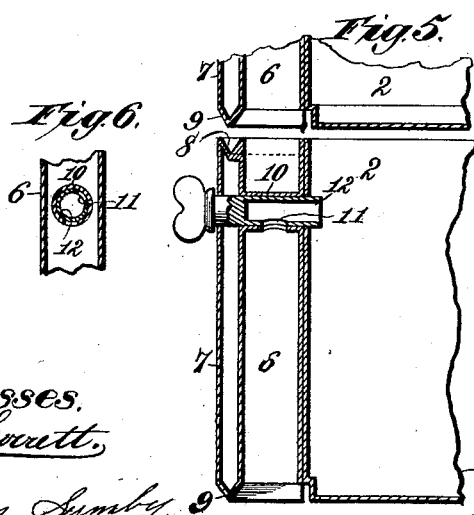
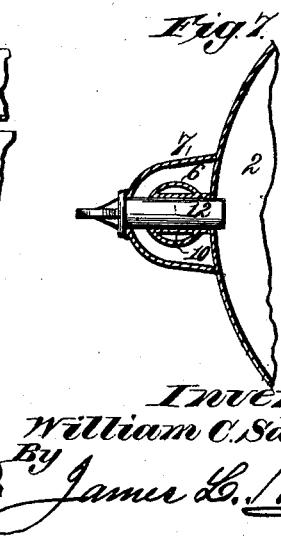
Witnesses
Robert Everett,
Dennis Lumby,
Inventor
William C. Salmon
By James L. Norris,
Atty.

UNITED STATES PATENT OFFICE.

WILLIAM C. SALMON, OF WAYNESBOROUGH, VIRGINIA.

STEAM-COOKER.

SPECIFICATION forming part of Letters Patent No. 367,240, dated July 26, 1887.

Application filed January 22, 1887. Serial No. 225,181. (No model.)

*To all whom it may concern:*

Be it known that I, WILLIAM C. SALMON, a citizen of the United States, residing at Waynesborough, in the county of Augusta and State of Virginia, have invented new and useful Improvements in Steam-Cookers, of which the following is a specification.

My invention relates to improvements in steam-cookers; and it consists in the novel features of construction and combinations of parts, hereinafter fully described, and then definitely pointed out in the claims.

In the annexed drawings, illustrating the invention, Figure 1 is a perspective view of my improved steam cooking apparatus. Fig. 2 is an elevation of one of the steam-compartments provided with a door and inclosing an oven, also having a door. Fig. 3 is a sectional elevation of one of the steam-compartments provided with devices for making coffee or tea by the drip process. Fig. 4 is a modification in the form of a portion of the coffee-making devices. Fig. 5 is a sectional view of one side of one of the steam-vessels and connected steam-pipe, showing the cut-off for regulating the admission of steam to the vessel, and also showing the water-joint at the connecting ends of the steam-pipes on the adjacent vessels. Figs. 6 and 7 are sectional detail views.

Referring to the drawings, it will be seen that my steam-cooking apparatus comprises a water vessel or boiler, 1, preferably cylindrical in form, and a series of steam-vessels, 2, placed one above another over said boiler. On one side of the boiler 1 is a filling-spout, 3, through which the boiler can be replenished without disturbing the steam-vessels, and this spout 3 is provided with a hinged lid, 4, to prevent the escape of steam through the spout while the apparatus is in use. The boiler 1 also has a faucet, 5, for drawing off its contents when desired.

The steam-vessels 2 have a form corresponding with that of the boiler 1, and communicate therewith through two steam passages or conduits, 6, one on each side of the apparatus, said conduits being each composed of several short pipe-sections that are attached to the several steam-vessels and to the upper part of the boiler, as shown in Fig. 1. Each of these pipe-sections is jacketed or inclosed in a casing, 7, of such diameter as to leave a space between the pipe-section and its casing, to prevent loss of heat by radiation or condensation as the steam passes upward through the conduits. If desired, the intervening space can be filled with some non-conductor of heat. The upper end of each pipe-section is formed with a circumferential groove, 8, and its lower end, 9, is somewhat beveled, to fit into the circumferential groove of the next pipe-section below, thus forming a joint in which the water of condensation will collect and effectually prevent the entrance of air into the steam-conduits. In each pipe-section 6 a transverse thimble, 10, is located, as shown in Fig. 5. This thimble is of somewhat smaller diameter than the pipe 6, so as not to prevent the passage of steam. In the under side of the thimble 10 is an opening that registers with an aperture, 11, in the side of a turn-plug, 12, which is fitted into the thimble. The inner end of each thimble and its turn-plug projects into the adjacent vessel or compartment 2, so that it is obvious the admission of steam can be regulated or entirely cut off from any vessel or compartment without affecting the others, by simply turning the several plugs in proper direction. Each steam-vessel 2 can have a faucet, 13, for drawing off any water of condensation. If desired, the vessels or compartments 2 can be made with doors 14; or, as preferred, some can be made with doors and some without.

In one of the vessels or compartments 2 having a door I can arrange a grating, 15, Fig. 2, and place thereon a circular oven, 16, having a close-fitting door, 17. By this construction the oven can be completely surrounded with steam, which, however, is excluded from the interior of the oven by the tightly-closed door 17, thus affording a convenient means for baking bread of fine quality.

The upper steam vessel or compartment, instead of having a door in its side, is preferably provided with a lid, 18. This upper vessel can be conveniently appropriated for making tea or coffee by the drip process. For this purpose a filter cloth or bag, 19, of suitable material is suspended in the vessel, as shown in Fig. 3. Above this filter cloth or bag 19 is arranged a perforated trough or pipe, 20, to collect the condensed steam and precipitate it gradually into the contents of the filter. The perforated pipe 20 has a funnel attachment, 21, on the outside of the vessel, through which water can be introduced. In the drip-pipe 20 can be placed a screw-spindle, 22, to regulate the drip. If desired, the drip-pipe 20 can terminate in a dish or pan, 23, Fig. 4, having its surface covered with upward-projecting nipples, through which the drip can be distributed uniformly over a larger surface than with the drip-pipe alone.

By giving the steam vessels or compartments 2 a double communication with the boiler, and providing the steam passages or conduits 6 with means for controlling the admission of steam to said vessel, as described, several culinary operations requiring different degrees of heat can be carried on at once, and the heat in each separate chamber be uniformly distributed therein. This construction also permits any steam-vessel to be entirely cut off from the others, so that when the contents of one vessel have been sufficiently cooked the steam can be cut off from that vessel and cooked articles allowed to remain in a moderate heat, if desired, until the contents of the other vessels are done.

What I claim as my invention is—

1. In a steam-cooking apparatus, the combination, with a boiler, of a series of separable successively-imposed vessels, each having jacketed steam tubes or passages extending along its opposite sides, and cut-offs arranged in each passage to regulate communication with the interior of each vessel, the upper end of each passage being provided with a circumferential groove formed in the metal closing the space between the passage and the jacket, and its lower end having a circumferential edge, similarly located, whereby a tight joint is formed by the water of condensation, substantially as described.

2. The combination, with a steam-cooking vessel or compartment having a faucet, of a filter suspended therein, a condensing-pan suspended above the filter and having nipples rising from its bottom, said nipples having perforations passing through the pan-bottom, and a filling device communicating with said pan from without, substantially as described.

3. The combination, with a steam-cooking vessel, of a filter suspended therein, a condensing-pan arranged above the filter, a filling spout or funnel arranged outside the vessel and communicating with the said pan, a valve closing the opening between the two, and a threaded stem tapped through the filling-pipe, substantially as described.

4. The combination, with a steam-cooking vessel, of a removable filter suspended therein, a drip device or condensing-pan, 23, arranged above the same and having perforated nipples 24, a supply-pipe, 20, entering the wall of the vessel and communicating with the pan, and a valve closing said pipe, substantially as described.

5. The herein-described steam-cooking apparatus, composed of the boiler 1, having filling spout 3 and faucet 5, the steam-vessels 2, located in a vertical series above the boiler, the steam conduits or pipes 6, extending along opposite sides of the steam-vessels and communicating with said vessels and boiler, the transverse thimbles 10, placed in the pipes 6, opposite to and communicating with each steam-vessel, and the turn-plugs 12, fitted in said thimbles, substantially as described.

In testimony whereof I affix my signature in presence of two witnesses.

WM. C. SALMON.

Witnesses:
  THOS. McDONALD,
  S. S. LANIER.